(12) United States Patent
Machani

(10) Patent No.: US 10,511,436 B1
(45) Date of Patent: Dec. 17, 2019

(54) PROTECTING KEY MATERIAL USING WHITE-BOX CRYPTOGRAPHY AND SPLIT KEY TECHNIQUES

(71) Applicant: EMC IP Holding Company LLC, Hopkinton, MA (US)

(72) Inventor: Salah Machani, Thornhill (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 166 days.

(21) Appl. No.: 15/664,250

(22) Filed: Jul. 31, 2017

(51) Int. Cl.
*H04L 9/32* (2006.01)
*H04L 9/08* (2006.01)
*H04L 9/14* (2006.01)
*H04L 9/30* (2006.01)

(52) U.S. Cl.
CPC ............ *H04L 9/085* (2013.01); *H04L 9/0822* (2013.01); *H04L 9/14* (2013.01); *H04L 9/30* (2013.01); *H04L 9/3247* (2013.01); *H04L 9/3263* (2013.01); *H04L 9/3271* (2013.01); *H04L 2209/16* (2013.01)

(58) Field of Classification Search
None
See application file for complete search history.

(56) References Cited

U.S. PATENT DOCUMENTS

| | | | | |
|---|---|---|---|---|
| 7,181,017 | B1 * | 2/2007 | Nagel | H04L 9/0825 380/282 |
| 2014/0289833 | A1 * | 9/2014 | Briceno | H04L 63/08 726/7 |
| 2015/0121068 | A1 * | 4/2015 | Lindemann | H04L 63/0823 713/158 |
| 2018/0191501 | A1 * | 7/2018 | Lindemann | H04L 9/3231 |

OTHER PUBLICATIONS

Brecht Wyseur, "White-Box Cryptography: Hiding Keys in Software," Misc Magazine (Apr. 2012).
Whiteboxcrypto, "WBC: Protecting Cryptographic Keys in Software Applications," Apr. 2012.

* cited by examiner

*Primary Examiner* — Brandon S Hoffman
(74) *Attorney, Agent, or Firm* — Ryan, Mason & Lewis, LLP

(57) ABSTRACT

Key material is protected using white-box cryptography and split key techniques. An exemplary method comprises splitting a secret key of a software application provider into a plurality of key shares, wherein a subset of the plurality of key shares is needed to reconstruct the secret key; using one key share to encrypt the remaining key shares to obtain a set of wrapped key shares; applying the one key share to a white-box cryptography compiler to generate a white-box cryptographic program; generating a user application linked to the white-box cryptography program; distributing the user application to a user; and providing one wrapped key share to a relying party, wherein, the relying party provides a challenge and the one wrapped key share of the relying party to the user application, wherein the user application provides the one wrapped key share of the relying party to the white-box cryptographic program and obtains a digital signature for the relying party, and wherein the relying party verifies the signature.

20 Claims, 6 Drawing Sheets

PROTECTING KEY MATERIAL USING WHITE-BOX CRYPTOGRAPHY AND SPLIT KEY TECHNIQUES

FIELD

The present invention relates to the protection of secret keys in devices.

BACKGROUND

Application developers must protect sensitive content on devices where access to an embedded, pluggable or external hardware secure element is not feasible. Developers have limited options to ensure the protection of their sensitive content. Typical methods either rely on the native platform protection mechanisms, such as an application sandbox for separating running programs, combined with optional encryption under a global disk encryption key or derive an encryption key from a weak user personal identification number (PIN) or password.

For example, FIDO (Fast Identity Online) is a security industry organization addressing problems that users face with creating and remembering multiple usernames and passwords for web sites and cloud applications. FIDO has specified a Universal Authentication Framework (UAF) and a Second Factor Authentication (U2F) technique. Generally, FIDO protocols are based on public key cryptography and are resistant to phishing attacks.

Nonetheless, a need remains for new techniques for protecting one or more secret keys on devices, such as mobile devices. A further need exists for new techniques for protecting key material using white-box cryptography and split key techniques.

SUMMARY

Methods and apparatus are provided for protecting key material using white-box cryptography and split key techniques. In one embodiment, an exemplary method comprises splitting a secret key of a software application provider into a plurality of key shares, wherein a subset of the plurality of key shares is needed to reconstruct the secret key; using one of the plurality of key shares to encrypt the remaining key shares of the plurality of key shares to obtain a set of wrapped key shares; applying the one key share to a white-box cryptography compiler to generate a white-box cryptographic program; generating a user application that is linked to the white-box cryptography program; distributing the user application to at least one user; and providing one of the set of wrapped key shares to a relying party, wherein, upon the user application of the at least one user attempting to access a resource protected by the relying party, the relying party provides a challenge and the one wrapped key share of the relying party to the user application, wherein the user application provides at least the one wrapped key share of the relying party to the white-box cryptographic program to obtain a digital signature in response to the challenge to provide to the relying party, and wherein the relying party verifies the signature to determine whether the user device is authorized to access the resource.

Other illustrative embodiments include, without limitation, apparatus, systems, methods and computer program products comprising processor-readable storage media.

DETAILED DESCRIPTION

Figure 1:
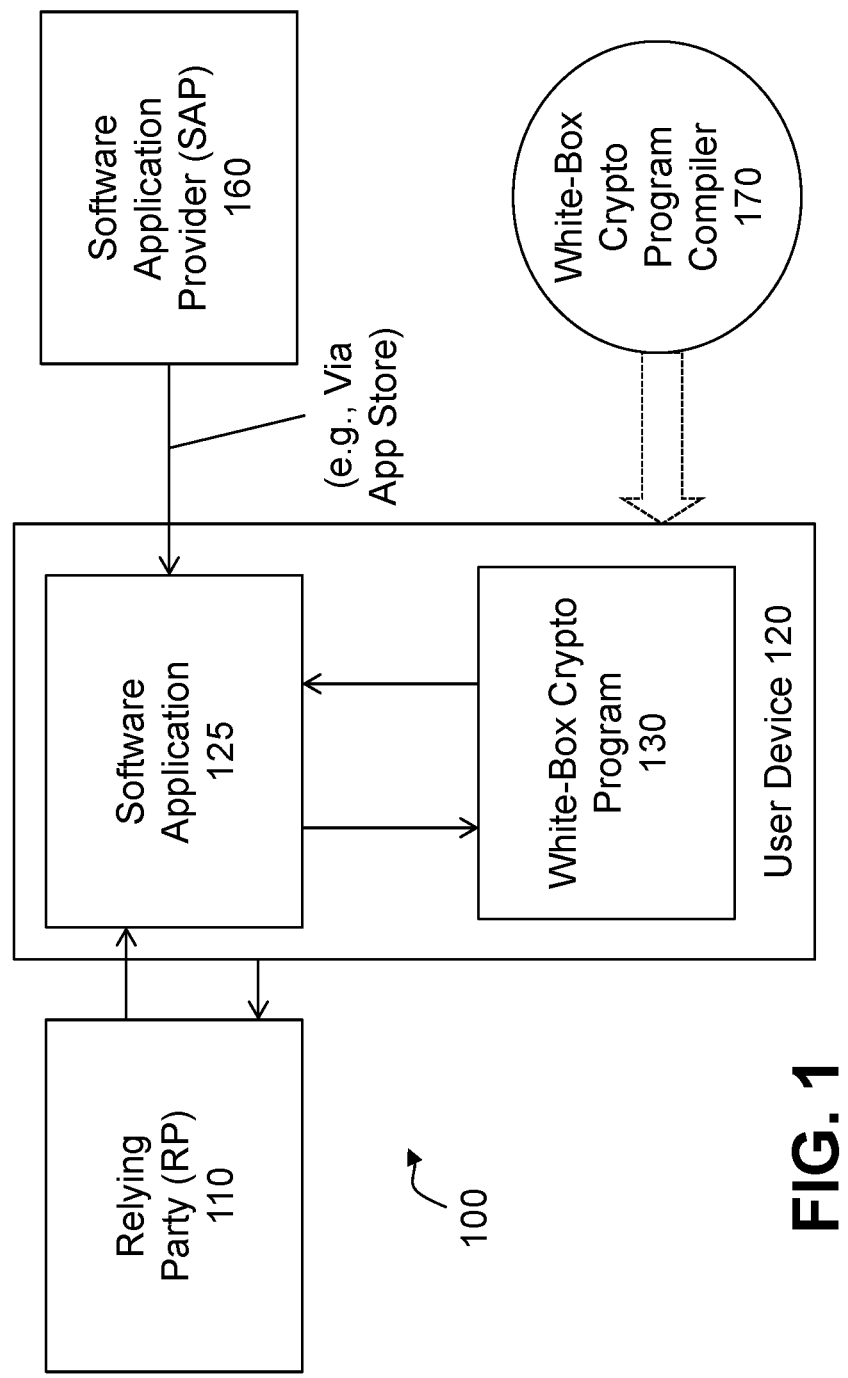
FIG. 1 illustrates an information processing system configured in accordance with an embodiment of the present disclosure.

Illustrative embodiments of the present disclosure will be described herein with reference to exemplary communication, storage and processing devices. It is to be appreciated, however, that the disclosure is not restricted to use with the particular illustrative configurations shown. As will be described, the present invention in one or more illustrative embodiments provides systems and methods for key material protection on devices using white-box cryptography and split key techniques. The disclosed methods can be applied, for example, to key encryption keys (KEKs), Data Encryption Keys (DEKs), master keys, attestation keys, or any other secrets or key material used for the protection of sensitive content or resources. While the present invention is illustrated herein primarily in the context of mobile devices, aspects of the present invention can be applied to protect secret keys in any device, as would be apparent to a person of ordinary skill in the art.

In at least one embodiment, secret key materials are protected in software on one or more devices by leveraging a technique that is based on a combination of threshold-based secret sharing and white-box cryptography techniques.

In one or more embodiments, a secret key of a software application provider is split into a plurality of key shares and one of the plurality of key shares is used to encrypt the remaining key shares of the plurality of key shares to obtain a set of wrapped key shares. A threshold defines a subset of the key shares that is needed to reconstruct the secret key. The one key share is applied to a white-box cryptography compiler to generate a white-box cryptographic program. In addition, the software application provider generates a user application that is linked to the white-box cryptography program and is distributed to at least one user. The software application provider provides one of the set of wrapped key shares to a relying party. Upon the user application attempting to access a protected resource protected by the relying party, the relying party provides a challenge and the one wrapped key share of the relying party to the user application. The user application provides at least the one wrapped key share of the relying party to the white-box cryptographic program to obtain a digital signature in response to the challenge to provide to the relying party. The relying party verifies the signature to determine whether the user device is authorized to access the protected resource.

While one or more embodiments are described primarily in the context of authentication of users and/or user devices using a secret key, the disclosed key material protection techniques can also be used to protect a master key that protects additional keys or bootstraps new device keys, as would be apparent to a person of ordinary skill in the art. Generally, for master key encryption, the master encryption key is split into multiple shares, and one wrapped master encryption key share and the full master key are sent securely to a relying party, in a known manner. The master key can be used for (i) authentication, (ii) encryption/decryption of data, and/or (iii) deriving new authentication or encryption/decryption keys.

FIG. 1 illustrates an information processing system 100 configured in accordance with an embodiment of the present disclosure. The information processing system 100 is assumed to be built on at least one processing platform and in this embodiment illustratively comprises a user device 120 executing a software application 125, a software application provider (SAP) 160 that generates the software application 125, a relying party (RP) (e.g., a web site) 110 that needs to authenticate and trust the integrity of the software application 125, and, optionally, an external application metadata service (not shown in FIG. 1), all of which are coupled to, and communicate over, a network (not shown).

In at least one embodiment, as discussed further below in conjunction with FIG. 2, the software application provider 160 generates a private key and a public key certificate, splits the private key into at least first and second key shares, uses the first key share as input into a white-box cryptography program compiler 170 that produces a white-box cryptography program 130 for a specific cryptography algorithm, uses the first key share to wrap the second key share, sends the wrapped second key share and the public key certificate to the RP 110, and optionally discards the original key and derived key shares.

Generally, as discussed further below in conjunction with FIGS. 3 and 4, when a user executes the software application 125 embedding the white-box cryptography program 130 on the user device 120 and the software application 125 attempts to access a resource at the relying party 110, the relying party 110 server returns a challenge to the user device 120 and the wrapped second key share via a secure protocol exchange to the software application 125. The software application 125 then uses the wrapped second key share and the relying party server 110 challenge as input data to the white-box cryptography program 130 to compute a signature on the challenge, and then returns the signature to the relying party server 110 to authenticate and access the resource that is protected by the relying party 110.

The user device 120 may be implemented, for example, as a desktop computer, laptop computer, tablet computer, mobile telephone or another type of computing device. The network may comprise, for example, a global computer network such as the Internet, a wide area network (WAN), a local area network (LAN), a satellite network, a telephone or cable network, a cellular network, a wireless network such as a WiFi network or a WiMAX network, or various portions or combinations of these and other types of networks.

White-Box Cryptography

White-box cryptography technology comprises a program-generating compiler that takes as input a secret key and produces a program that implements a specific cryptographic algorithm with the specified secret key. Anyone in control of the generated program can execute it on any data input and get the expected data output, but is unable to learn anything about the secret key. The white-box program remains indecipherable and securely hides the secret key, just as trusted hardware would.

For a more detailed discussion of white-box cryptography techniques, see, for example, Brecht Wyseur, "White-Box Cryptography: Hiding Keys in Software," MISC Magazine (April 2012) and/or Whiteboxcrypto, "WBC: Protecting Cryptographic Keys in Software Applications," each incorporated by reference herein in its entirety.

In various embodiments of the disclosure discussed herein, as discussed further below in conjunction with FIGS. 3 and 4, respectively, the white-box cryptography program compiler 170 generates a first white-box cryptography program 130-1 or a second white-box cryptography program 130-2. Generally, the first white-box cryptography program 130-1 performs a key wrapping function and key reconstruction using a threshold secret sharing scheme, and the cryptographic operations (such as data encryption/decryption or signing) using the reconstructed key. For example, the first white-box cryptography program 130-1 takes as input one or more wrapped key shares and challenge data produces and returns a signature on the data. The second white-box cryptography program 130-2 performs a key wrapping function and key reconstruction using a threshold secret sharing scheme. The second white-box cryptography program 130-2 takes as input one or more wrapped key shares and produces and returns the original key.

Generally, the first white-box cryptography program 130-1 hides the secret key from the user application layer and only returns the result of the cryptographic computation on the input data using the reconstructed secret key. Thus, in one or more embodiments, the first white-box cryptography program 130-1 may be preferred. The second white-box cryptography program 130-2 may be considered, for example, in cases where access to the secret key is required at the application layer.

Figure 2:
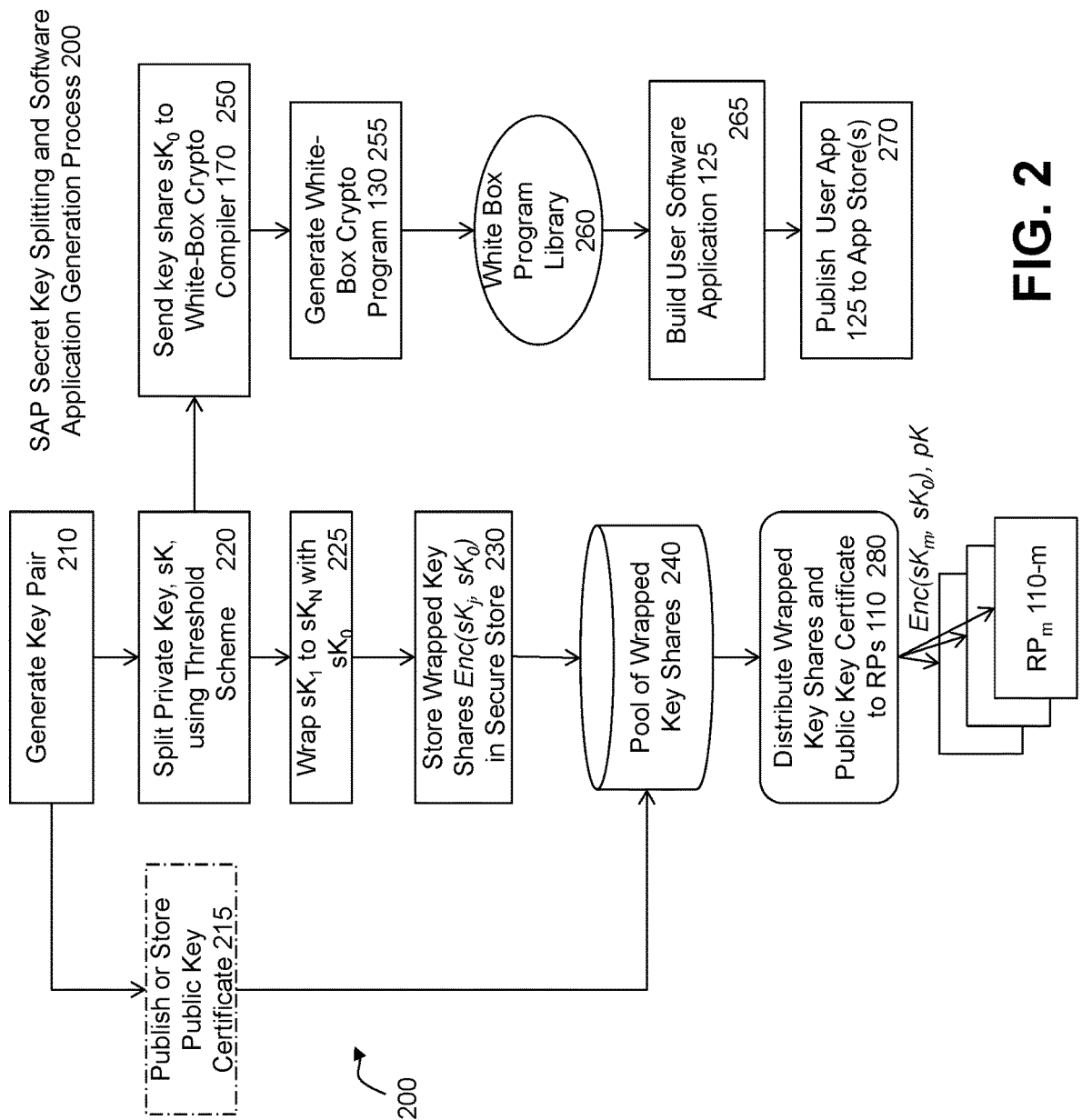
FIG. 2 is a flow chart illustrating an implementation of an exemplary secret key splitting and software application generation process, according to one embodiment of the disclosure.

FIG. 2 is a flow chart illustrating an implementation of an exemplary secret key splitting and software application generation process 200, according to one embodiment of the disclosure. Generally, the secret key splitting and software application generation process 200 is executed by the software application provider 160 to generate and split a secret key into a plurality of key shares, generate and provide the white-box program 130 to protect one of the key shares, and distribute the remaining key shares to one or more relying parties 110.

As shown in FIG. 2, the exemplary secret key splitting and software application generation process 200 initially generates a key pair during step 210 and optionally publishes or stores the public key certificate from the key pair during step 215. The private key, sK, is then split during step 220 using a threshold-based key splitting scheme, discussed below. The secret key splitting and software application generation process 200 then wraps the key shares, $sK_1$ to $sK_N$, with a first key share, $sK_0$, during step 225. The wrapped key shares, $Enc(sK_j, sK_0)$ (for j=1 to N), are stored in a secure store 240 during step 230.

Meanwhile, the software application provider 160 sends the first key share, $sK_0$, to the white-box crypto compiler 170 during step 250 and generates the white-box crypto program 130 during step 255, which is optionally stored in a white-box program library 260.

The secret key splitting and software application generation process 200 builds a user software application 125 during step 265 and optionally publishes the software application 125 to an application store (e.g., App Store) during step 270. The wrapped key shares and public key certificate are distributed to the relying parties 110 during step 280.

Figure 3:
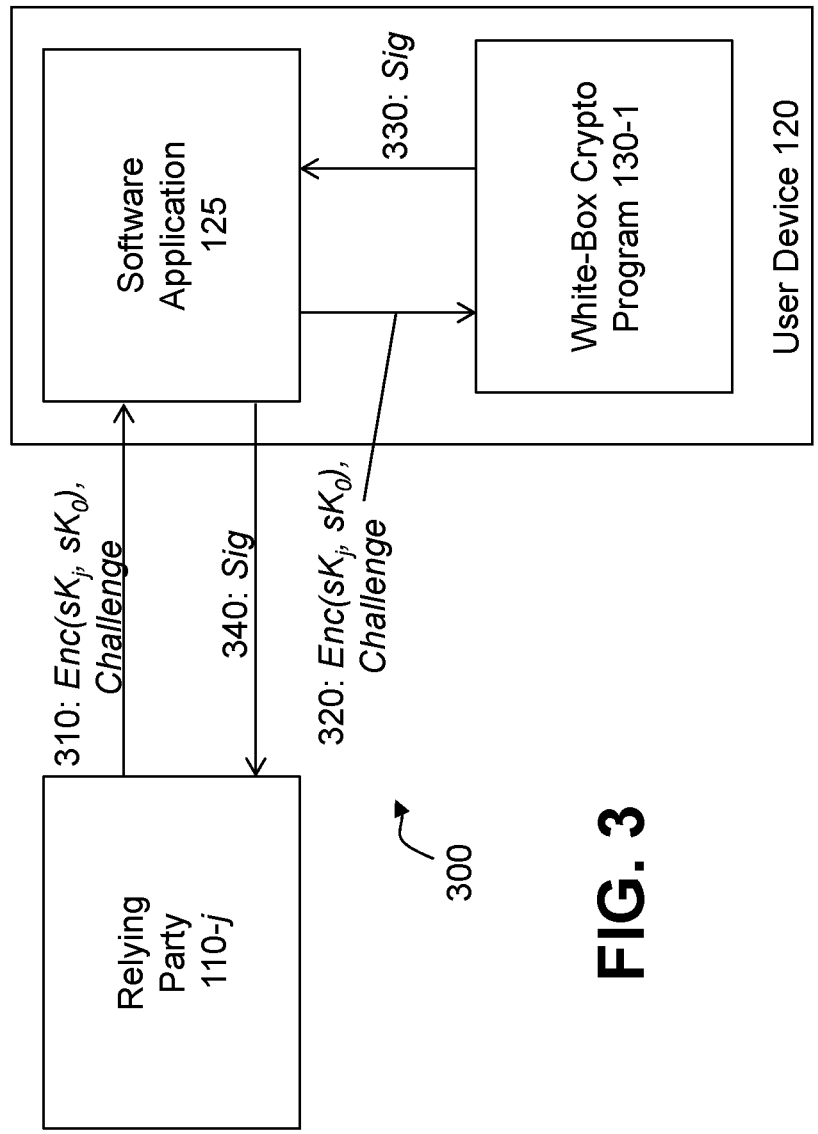
FIGS. 3 and 4 illustrate exemplary challenge-response authentication processes according to different operational modes of the white-box cryptography program of FIG. 1, in two embodiments of the disclosure.

FIG. 3 illustrates an exemplary challenge-response authentication processes 300 according to a first operational mode 130-1 of the white-box cryptography program 130 of FIG. 1, according to an embodiment of the disclosure.

Generally, the exemplary authentication process 300 performs authentication using digital signatures, where the signature is generated by the white-box crypto program 130-1.

The exemplary authentication process 300 is initiated, for example, by the software application 125 executing on the user device 120, when the user attempts to access a resource (not shown) protected by a relying party server, such as relying party server 110-j. Relying party server 110-j returns a challenge and the wrapped key share Enc(sKj, sK0) of the relying party server 110-j to the software application 125 during step 310.

The software application 125 then invokes the white-box cryptographic program 130-1 and passes the wrapped key share Enc(sKj, sK0) of the relying party 110-j and the challenge to the white-box cryptographic program 130-1 during step 320. The white-box cryptographic program 130-1 then generates a digital signature sig on the challenge and returns the digital signature sig to the software application 125 during step 330. The software application 125 then returns the digital signature sig on the challenge to the RP server 110-j during step 340.

The relying party server 110 verifies the signature internally using the published public key certificate pK of the software application provider 160 to determine whether the user device 120 is authorized to access the protected resource.

Generally, given the challenge and the wrapped key share Enc(sKj, sK0) of the relying party server 110-j, the white-box cryptographic program 130-1 generates the digital signature sig on the challenge. The white-box cryptographic program 130-1 has the key share $sK_0$ embedded in its software and uses the key share $sK_0$ to unwrap key share $sK_j$. In a threshold-based scheme where only two shares are required, the white-box cryptographic program 130-1 can now reconstruct the original secret key, sK, of the software application provider 160 and generate the digital signature sig.

As noted above, the exemplary white-box cryptography program 130-1 comprises key wrapping functionality and key reconstruction functionality using the threshold secret sharing scheme, as well as the cryptographic operations (such as data encryption/decryption or signing) using the reconstructed secret key, $sK_0$. For example, the program 130-1 takes as input one or more wrapped key shares and the challenge data and returns a signature on the challenge data. In addition, the embodiment of FIG. 3 preserves the privacy of the original secret key, sK, of the software application provider 160, since it does not leave the trusted white-box cryptography program 130-1.

Figure 4:
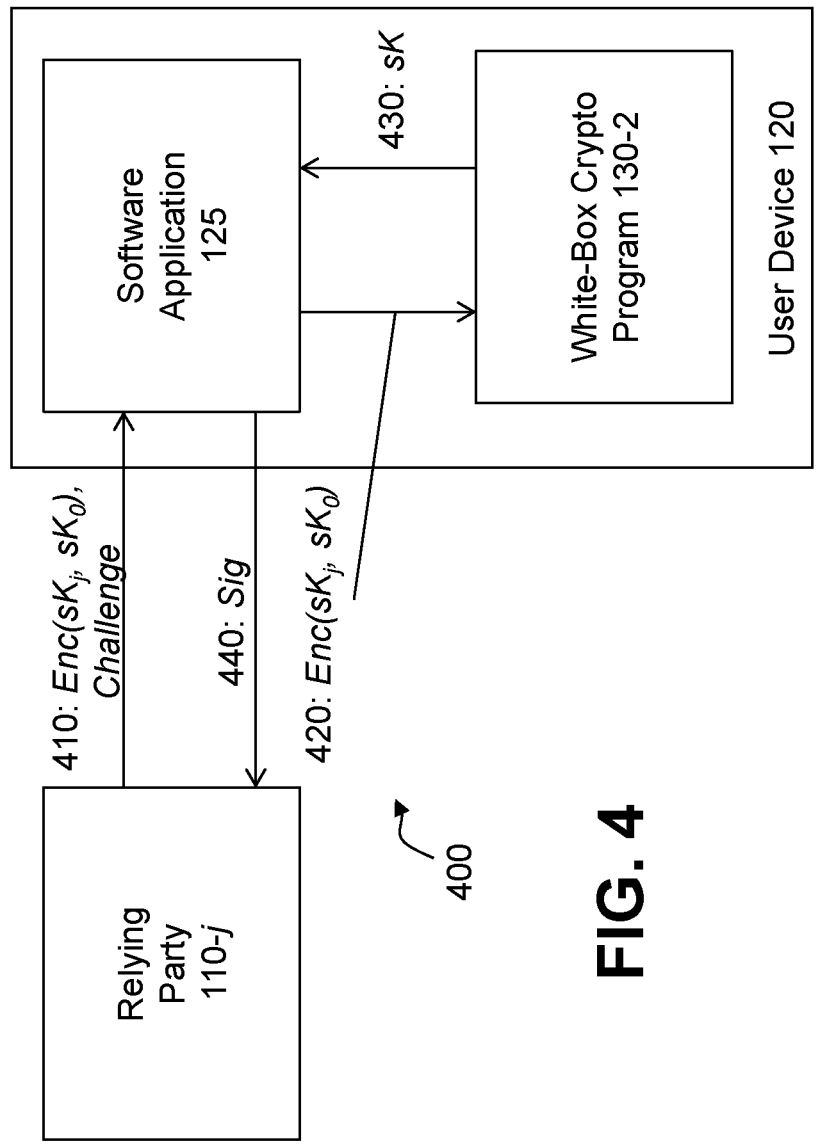

FIG. 4 illustrates an exemplary challenge-response authentication processes 400 according to a second operational mode 130-2 of the white-box cryptography program 130 of FIG. 1, according to an embodiment of the disclosure. Generally, the exemplary authentication process 400 performs authentication using digital signature, where the signature is generated by a user application, and the signing secret key is produced by the white-box crypto program 130-2 using a secret sharing reconstruction algorithm.

The exemplary authentication process 400 is initiated, for example, by the software application 125 executing on the user device 120, when the user attempts to access a resource (not shown) protected by a relying party server, such as relying party server 110-j. Relying party server 110-j returns a challenge and the wrapped key share Enc($sK_j$, $sK_0$) of the relying party server 110-j to the software application 125 during step 410.

The software application 125 then invokes the white-box cryptographic program 130-2 and passes the wrapped key share Enc($sK_j$, $sK_0$) of the relying party 110-j to the white-box cryptographic program 130-2 during step 420. The white-box cryptographic program 130-2 then reconstructs the original secret key, sK, and returns the secret key, sK, to the software application 125 during step 430.

As noted above, the white-box cryptographic program 130-1 has the key share $sK_0$ embedded in its software and uses the key share $sK_0$ to unwrap the wrapped key share $sK_j$ provided during step 420. In a threshold-based scheme where only two shares are required, the white-box cryptographic program 130-1 can now reconstruct the original secret key, sK, of the software application provider 160 and provide the original secret key, sK, of the software application provider 160 to the software application 125. The exemplary the white-box cryptography program 130-2 comprises key wrapping functionality and key reconstruction functionality using the threshold secret sharing scheme, taking as input one or more wrapped key shares and producing the original secret key.

The software application 125 then generates the digital signature sig on the challenge itself, using the original secret key, sK, of the software application provider 160, and returns the digital signature sig to the relying party server 110-j during step 440.

The relying party server 110-j then verifies the signature internally using the published public key certificate pK of the software application provider 160 to determine whether the user device 120 is authorized to access the protected resource.

For a more detailed discussion of threshold-based secret key reconstruction from multiple key shares, see, for example, U.S. Pat. No. 9,461,821, entitled "System and Method for Key Material Protection on Devices Using a Secret Sharing Scheme," incorporated by reference herein in its entirety.

Key Revocation and Refresh

In the event that both the white-box protected key share is discovered and one of the relying party wrapped key shares is stolen, the attacker will be able to discover the original secret key. Given the software nature of the disclosed authenticator, it will be more cost effective in one or more embodiments for the SAP 160 to revoke the existing key shares by simply generating a new secret key and repeating the secret key splitting and software application generation process 200 (FIG. 2) for producing a new white-box crypto program 130, publishing a new user application 125, and distributing new wrapped key shares to the relying parties.

Use Case: Verification of FIDO Authenticators

As noted above, FIDO (Fast Identity Online) is a security industry organization addressing problems that users face with creating and remembering multiple usernames and passwords for web sites and cloud applications. FIDO has specified a Universal Authentication Framework and a Second Factor Authentication technique. Generally, FIDO protocols are based on public key cryptography and are resistant to phishing attacks.

Each FIDO authenticator may have different characteristics. For example, a fingerprint authenticator may protect the authentication keys using a Trusted Execution Environment and may use a secure display to show transactions. The trust that an application places on a FIDO authentication may depend on the particular authenticator used. For this purpose, the application must be able to:

securely verify the authenticator employed on the user's device; and determine the characteristics of that authenticator.

To enable the verification of authenticators by applications, FIDO includes a cryptographic mechanism called attestation. Each FIDO authenticator embeds an attestation private key that is used to sign FIDO responses that it creates. Generally, the attestation private key is used to ensure that the authenticator is associated with a trusted manufacturer or provider. FIDO servers contain a database of attestation certificates of all known FIDO authenticators that they use to cryptographically verify that a FIDO response is actually from a specific authenticator. FIDO servers also include a metadata database that contains the characteristics of each known FIDO authenticator known as metadata statements. This information may be used for various purposes by the application such as to verify that the authenticator meets the requirements for the accepted authenticator's policy.

The metadata statement is a JSON (JavaScript Object Notation) file that is produced by the authenticator vendor and consumed by FIDO servers. The structure of the metadata statements is defined by the FIDO Alliance. The metadata statement contains information about the authenticator such as:

authenticator version;
authenticator ID (AAID);
attestation certificate;
user verification method such as fingerprint biometrics;
whether keys are protected by Trusted Execution Environment (TEE) or Secure Element (SE); and
whether biometrics are protected by the TEE.

The metadata statement is also used in the authenticator attestation process. For a particular authentication event, an application can specify policies on which authenticators it is willing to accept to a FIDO server. When a registration response is sent from an authenticator supporting attestation, it is signed using the authenticator's attestation key. The server looks up the metadata statement corresponding to the authenticator's Authenticator Attestation ID and verifies that the signature is genuine using the authenticator's public key from the attestation certificate in the metadata statement.

In one or more embodiments, the disclosed key material protection techniques can be used to protect the attestation key.

CONCLUSION

One or more embodiments of the disclosure provide methods and apparatus for protecting key material using white-box cryptography and split key techniques. In one or more embodiments, a secret key of a software application provider is split into a plurality of key shares and one of the plurality of key shares is used to encrypt the remaining key shares of the plurality of key shares to obtain a set of wrapped key shares. The one key share is applied to a white-box cryptography compiler to generate a white-box cryptographic program. In addition, the software application provider generates a user application that is linked to the white-box cryptography program and is distributed to at least one user. The software application provider provides one of the set of wrapped key shares to a relying party. Upon the user application attempting to access a protected resource protected by the relying party, the relying party provides a challenge and the one wrapped key share of the relying party to the user application. The user application provides at least the one wrapped key share of the relying party to the white-box cryptographic program to obtain a digital signature in response to the challenge to provide to the relying party. The relying party verifies the signature to determine whether the user device is authorized to access the protected resource.

The foregoing applications and associated embodiments should be considered as illustrative only, and numerous other embodiments can be configured using the techniques disclosed herein, in a wide variety of different applications.

It should also be understood that the disclosed techniques for key material protection, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for protecting key material using white-box cryptography and split key may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as data storage system 116, or portions thereof, are illustratively implemented for use by tenants of such a multi-tenant environment.

Cloud infrastructure as disclosed herein can include cloud-based systems such as AWS, GCP and Microsoft Azure™. Virtual machines provided in such systems can be used to implement at least portions of the disclosed key material protection devices in illustrative embodiments. The cloud-based systems can include object stores such as Amazon™ S3, GCP Cloud Storage, and Microsoft Azure™ Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the key material protection devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. These platforms may also be used to implement at least portions of other information processing systems in other embodiments.

Figure 5:
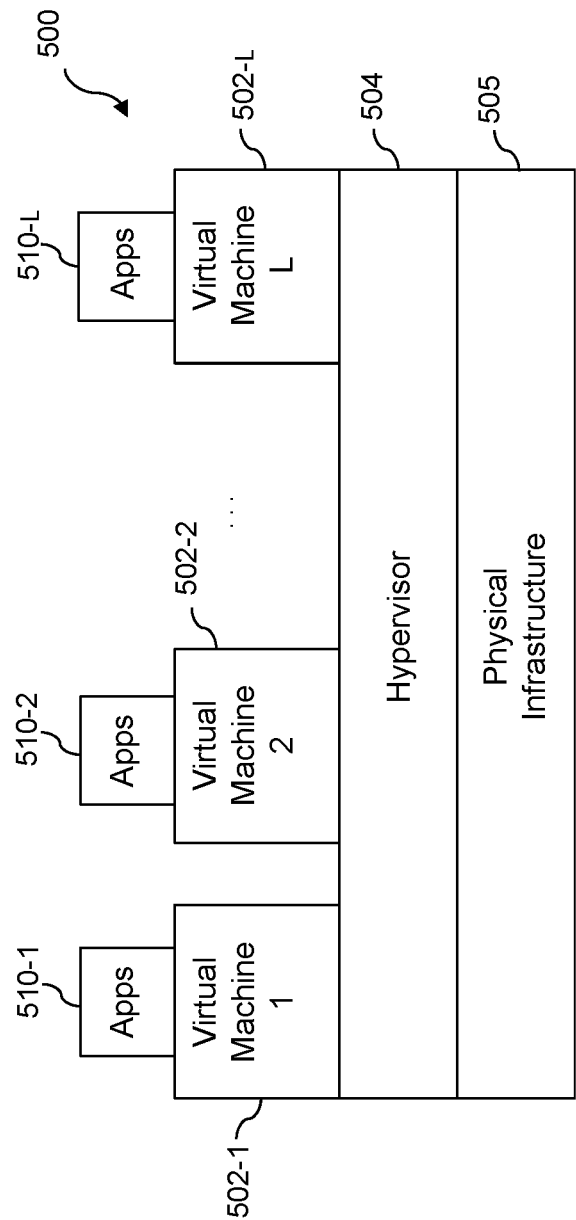
FIG. 5 illustrates an exemplary processing platform that may be used to implement at least a portion of one or more embodiments of the disclosure comprising a cloud infrastructure.

Referring now to FIG. 5, one possible processing platform that may be used to implement at least a portion of one or more embodiments of the disclosure comprises cloud infrastructure 500. The cloud infrastructure 500 in this exemplary processing platform comprises virtual machines (VMs) 502-1, 502-2, . . . 502-L implemented using a hypervisor 504. The hypervisor 504 runs on physical infrastructure 505. The cloud infrastructure 500 further comprises sets of applications 510-1, 510-2, . . . 510-L running on respective ones of the virtual machines 502-1, 502-2, . . . 502-L under the control of the hypervisor 504.

The cloud infrastructure 500 may encompass the entire given system or only portions of that given system, such as one or more of client, servers, controllers, or computing devices in the system.

Although only a single hypervisor 504 is shown in the embodiment of FIG. 5, the system may of course include multiple hypervisors each providing a set of virtual machines using at least one underlying physical machine. Different sets of virtual machines provided by one or more hypervisors may be utilized in configuring multiple instances of various components of the system.

An example of a commercially available hypervisor platform that may be used to implement hypervisor 504 and possibly other portions of the system in one or more embodiments of the disclosure is the VMware® vSphere™ which may have an associated virtual infrastructure management system, such as the VMware® vCenter™. As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC of Hopkinton, Mass. The underlying physical machines may comprise one or more distributed processing platforms that include storage products, such as VNX™ and Symmetrix VMAX™, both commercially available from Dell EMC. A variety of other storage products may be utilized to implement at least a portion of the system.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

As is apparent from the above, one or more of the processing modules or other components of the disclosed key material protection systems may each run on a computer, server, storage device or other processing platform element. A given such element may be viewed as an example of what is more generally referred to herein as a "processing device." The cloud infrastructure 500 shown in FIG. 5 may represent at least a portion of one processing platform.

Figure 6:
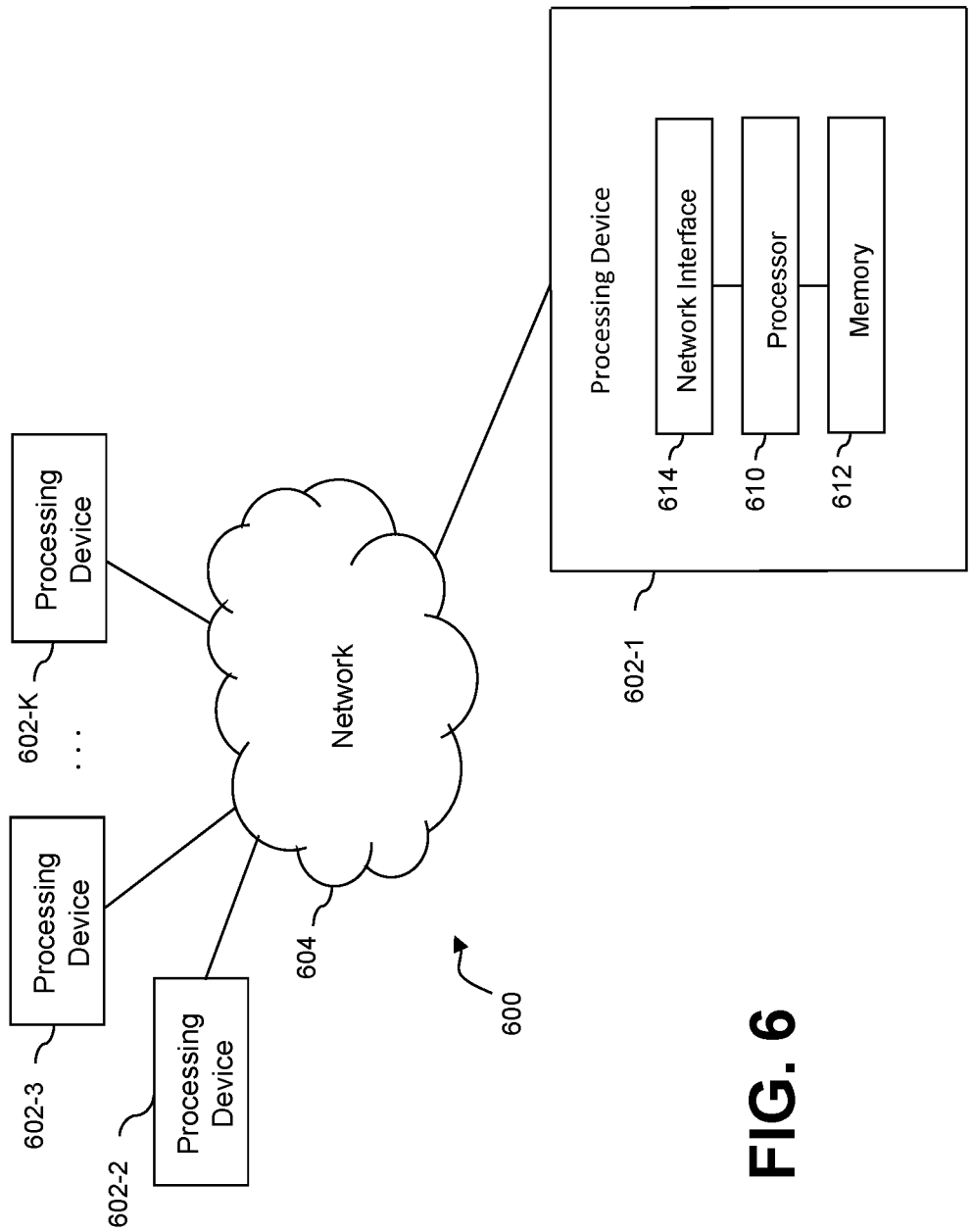
FIG. 6 illustrates another exemplary processing platform that may be used to implement at least a portion of one or more embodiments of the disclosure.

Another example of a processing platform is processing platform 600 shown in FIG. 6. The processing platform 600 in this embodiment comprises at least a portion of the given system and includes a plurality of processing devices, denoted 602-1, 602-2, 602-3, . . . 602-K, which communicate with one another over a network 604. The network 604 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an application specific integrated circuit (ASIC), a field programmable gate array (FPGA) or other type of processing circuitry, as well as portions or combinations of such circuitry elements, and the memory 612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM (random access memory), ROM (read only memory) or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 5 or 6, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of the processes shown in FIGS. 2 through 4 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, compute services platforms, and key material protection platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
splitting a secret key of a software application provider into a plurality of key shares, wherein a subset of said plurality of key shares is needed to reconstruct said secret key;
using one of said plurality of key shares to encrypt the remaining key shares of said plurality of key shares to obtain a set of wrapped key shares;
applying said one key share to a white-box cryptography compiler to generate a white-box cryptographic program;
generating a user application that is linked to the white-box cryptography program;
distributing said user application to at least one user; and
providing one of said set of wrapped key shares to a relying party,
wherein, upon said user application of said at least one user attempting to access a resource protected by said relying party, said relying party provides a challenge and said one wrapped key share of said relying party to said user application, wherein said user application provides at least said one wrapped key share of said relying party to said white-box cryptographic program to obtain a digital signature in response to said challenge to provide to said relying party, and wherein said relying party verifies the signature to determine whether the user device is authorized to access the resource.

2. The method of claim 1, wherein said secret key comprises a private key of a public/private key pair, wherein said step of providing said one wrapped key share to said relying party further comprises providing a public key certificate of said public/private key pair to said relying party, and wherein said relying party verifies the signature using the public key certificate of the software application provider to verify one or more of whether the user device is authorized to access the resource and an authenticity of an application attempting to access said resource.

3. The method of claim 1, wherein said secret key comprises a master key used for one or more of encryption/decryption of data, secure communication between a client and a server, deriving other keys, and user authentication, wherein said master key is split into a plurality of master key shares, and wherein said master key and one wrapped master key share are sent securely to said relying party.

4. The method of claim 1, wherein said user application provides said at least said one wrapped key share of said relying party and said challenge to said white-box cryptographic program and wherein said white-box cryptographic program generates said digital signature in response to said challenge that said user application provides to said relying party.

5. The method of claim 1, wherein said user application provides said one wrapped key share of said relying party to said white-box cryptographic program, and wherein said white-box cryptographic program uses said one key share to unwrap said one wrapped key share of said relying party, generates said secret key of said software application provider and provides said secret key to said user application, wherein said user application generates said digital signature in response to said challenge to provide to said relying party.

6. The method of claim 1, wherein the step of distributing said user application to at least one user comprises publishing the application to an application store for distributions to said at least one user.

7. The method of claim 1, wherein the step of providing one of said set of wrapped key shares to said relying party is performed by one or more middleware entities.

8. A computer program product, comprising a tangible machine-readable storage medium having encoded therein executable code of one or more software programs, wherein the one or more software programs when executed by at least one processing device perform the following steps:
splitting a secret key of a software application provider into a plurality of key shares,
wherein a subset of said plurality of key shares is needed to reconstruct said secret key;

using one of said plurality of key shares to encrypt the remaining key shares of said plurality of key shares to obtain a set of wrapped key shares;

applying said one key share to a white-box cryptography compiler to generate a white-box cryptographic program;

generating a user application that is linked to the white-box cryptography program;

distributing said user application to at least one user; and providing one of said set of wrapped key shares to a relying party, wherein, upon said user application of said at least one user attempting to access a resource protected by said relying party, said relying party provides a challenge and said one wrapped key share of said relying party to said user application, wherein said user application provides at least said one wrapped key share of said relying party to said white-box cryptographic program to obtain a digital signature in response to said challenge to provide to said relying party, and wherein said relying party verifies the signature to determine whether the user device is authorized to access the resource.

9. The computer program product of claim 8, wherein said secret key comprises a private key of a public/private key pair, wherein said step of providing said one wrapped key share to said relying party further comprises providing a public key certificate of said public/private key pair to said relying party, and wherein said relying party verifies the signature using the public key certificate of the software application provider to verify one or more of whether the user device is authorized to access the resource and an authenticity of an application attempting to access said resource.

10. The computer program product of claim 8, wherein said secret key comprises a master key used for one or more of encryption/decryption of data, secure communication between a client and a server, deriving other keys, and user authentication, wherein said master key is split into a plurality of master key shares, and wherein said master key and one wrapped master key share are sent securely to said relying party.

11. The computer program product of claim 8, wherein said user application provides said at least said one wrapped key share of said relying party and said challenge to said white-box cryptographic program and wherein said white-box cryptographic program generates said digital signature in response to said challenge that said user application provides to said relying party.

12. The computer program product of claim 8, wherein said user application provides said one wrapped key share of said relying party to said white-box cryptographic program, and wherein said white-box cryptographic program uses said one key share to unwrap said one wrapped key share of said relying party, generates said secret key of said software application provider and provides said secret key to said user application, wherein said user application generates said digital signature in response to said challenge to provide to said relying party.

13. The computer program product of claim 8, wherein the step of providing one of said set of wrapped key shares to said relying party is performed by one or more middleware entities.

14. A system, comprising:
a memory; and
at least one processing device, coupled to the memory, operative to implement the following steps:
splitting a secret key of a software application provider into a plurality of key shares,
wherein a subset of said plurality of key shares is needed to reconstruct said secret key;
using one of said plurality of key shares to encrypt the remaining key shares of said plurality of key shares to obtain a set of wrapped key shares;
applying said one key share to a white-box cryptography compiler to generate a white-box cryptographic program;
generating a user application that is linked to the white-box cryptography program;
distributing said user application to at least one user; and
providing one of said set of wrapped key shares to a relying party,
wherein, upon said user application of said at least one user attempting to access a resource protected by said relying party, said relying party provides a challenge and said one wrapped key share of said relying party to said user application, wherein said user application provides at least said one wrapped key share of said relying party to said white-box cryptographic program to obtain a digital signature in response to said challenge to provide to said relying party, and wherein said relying party verifies the signature to determine whether the user device is authorized to access the resource.

15. The system of claim 14, wherein said secret key comprises a private key of a public/private key pair, wherein said step of providing said one wrapped key share to said relying party further comprises providing a public key certificate of said public/private key pair to said relying party, and wherein said relying party verifies the signature using the public key certificate of the software application provider to verify one or more of whether the user device is authorized to access the resource and an authenticity of an application attempting to access said resource.

16. The system of claim 14, wherein said secret key comprises a master key used for one or more of encryption/decryption of data, secure communication between a client and a server, deriving other keys, and user authentication, wherein said master key is split into a plurality of master key shares, and wherein said master key and one wrapped master key share are sent securely to said relying party.

17. The system of claim 14, wherein said user application provides said at least said one wrapped key share of said relying party and said challenge to said white-box cryptographic program and wherein said white-box cryptographic program generates said digital signature in response to said challenge that said user application provides to said relying party.

18. The system of claim 14, wherein said user application provides said one wrapped key share of said relying party to said white-box cryptographic program, and wherein said white-box cryptographic program uses said one key share to unwrap said one wrapped key share of said relying party, generates said secret key of said software application provider and provides said secret key to said user application, wherein said user application generates said digital signature in response to said challenge to provide to said relying party.

19. The system of claim 14, wherein the step of distributing said user application to at least one user comprises publishing the application to an application store for distributions to said at least one user.

20. The system of claim 14, wherein the step of providing one of said set of wrapped key shares to said relying party is performed by one or more middleware entities.

\* \* \* \* \*